(12) United States Patent
Gremmert (10) Patent No.: US 8,065,043 B2
(45) Date of Patent: Nov. 22, 2011

(54) PREDICTED PATH SELECTION SYSTEM AND METHOD FOR HAZARD CODING IN SELECTIVELY CONSTRAINED AIRCRAFT CONTROL SYSTEMS

(75) Inventor: Scott R. Gremmert, Redmond, WA (US)

(73) Assignee: Honeywell International Inc., Morristown, NY (US)

( * ) Notice: Subject to any disclaimer, the term of this patent is extended or adjusted under 35 U.S.C. 154(b) by 0 days.

(21) Appl. No.: 12/813,238

(22) Filed: Jun. 10, 2010

(65) Prior Publication Data

US 2010/0250032 A1 Sep. 30, 2010

Related U.S. Application Data

(62) Division of application No. 11/364,066, filed on Feb. 28, 2006, now Pat. No. 7,801,649.

(51) Int. Cl.
*G05D 1/00* (2006.01)
(52) U.S. Cl. .............. 701/9; 701/204; 701/207; 701/3; 340/945
(58) Field of Classification Search .............. 701/3, 9, 701/14, 120, 207, 209, 301
See application file for complete search history.

(56) References Cited

U.S. PATENT DOCUMENTS

| | | | |
|---|---|---|---|
| 5,631,640 A * | 5/1997 | Deis et al. | 340/961 |
| 5,884,223 A * | 3/1999 | Tognazzini | 701/301 |
| 5,892,462 A | 4/1999 | Tran | |
| 6,097,996 A * | 8/2000 | Deker | 701/10 |
| 6,173,219 B1 * | 1/2001 | Deker | 701/3 |
| 6,289,277 B1 | 9/2001 | Feyereisen et al. | |
| 6,347,263 B1 * | 2/2002 | Johnson et al. | 701/14 |
| 6,401,038 B2 * | 6/2002 | Gia | 701/301 |
| 6,700,482 B2 | 3/2004 | Ververs et al. | |
| 6,744,382 B1 | 6/2004 | Lapis et al. | |
| 7,194,353 B1 | 3/2007 | Baldwin et al. | |
| 7,444,211 B2 | 10/2008 | Charles | |
| 7,584,046 B2 * | 9/2009 | Deker | 701/120 |
| 2001/0023390 A1 * | 9/2001 | Gia | 701/301 |
| 2002/0149599 A1 | 10/2002 | Dwyer et al. | |
| 2003/0083804 A1 * | 5/2003 | Pilley et al. | 701/120 |
| 2003/0222795 A1 * | 12/2003 | Holforty et al. | 340/968 |
| 2004/0189492 A1 * | 9/2004 | Selk, II et al. | 340/973 |
| 2006/0025898 A1 * | 2/2006 | Charles | 701/3 |
| 2006/0238377 A1 | 10/2006 | Stiles et al. | |
| 2007/0233331 A1 | 10/2007 | Caillaud | |

* cited by examiner

*Primary Examiner* — Mark Hellner
*Assistant Examiner* — Helal A Algahaim
(74) *Attorney, Agent, or Firm* — Lowe Graham Jones PLLC (57) ABSTRACT

A surveillance system detects potential hazards and alerts the pilot to them. The alerts can be modified to indicate proximity to the predicted path of the aircraft. An autopilot receives instructions from a flight management system (FMS) regarding a planned path and is subject to constraints preempting the planned path. The surveillance system selects which of the planned and a constrained path will be followed for alerting and hazard coding purposes. Means are disclosed to determine when the constrained path will be followed by comparing the current position of an aircraft, the planned path, and the constraint data. Current positions exceeding the tolerance cause the surveillance system to select the planned path as the future path to be followed. If initiation of a constraint has been detected and the current position is within the tolerance, the surveillance system selects the constrained path as the future path.

13 Claims, 6 Drawing Sheets

PREDICTED PATH SELECTION SYSTEM AND METHOD FOR HAZARD CODING IN SELECTIVELY CONSTRAINED AIRCRAFT CONTROL SYSTEMS

PRIORITY CLAIM

This application is a divisional of U.S. application Ser. No. 11/364,066, filed on Feb. 28, 2006, all of which is hereby incorporated by reference in its entirety.

BACKGROUND OF THE INVENTION

Modern aircraft are typically flown by a computerized autopilot (AP). The AP interfaces with Flight Control computers that are coupled both to actuators coupled to control surfaces and to engine computers such as a fully automated digital control (FADEC) computer. Together these cause the aircraft to follow a prescribed path and to maintain proper lift. A navigational computer or flight management system (FMS) receives pilot input regarding intended lateral path to a destination and either receives a vertical flight plan or develops the vertical flight plan based on pilot input, the present position and condition of the aircraft, and current flying conditions such as wind. The vertical and lateral flight paths are typically represented as a series of interconnected waypoints describing a path between points of departure and arrival. The FMS directs the AP to pilot the aircraft according to the flight plan.

In some instances, constraints are input to the AP based on instructions from ground based air traffic control (ATC) systems constraining the flight path of the aircraft. These constraints are typically an altitude ceiling above which the aircraft is not permitted to fly or an altitude floor above which an aircraft must fly. The constraints preempt control of the AP by the FMS. The FMS may nonetheless direct the AP to the extent a planned flight path does not conflict with AP constraints.

A surveillance system monitors hazards around the airplane and along a predicted flight path. Hazards include weather systems, turbulence, mountains, other aircraft, volcanic ash, and the like. The location of hazards is displayed to the operator of the aircraft (whether onboard or remote) by means of a screen or heads up display in the cockpit. Hazards may be displayed in a navigational, or plan, display illustrating the horizontal position of the aircraft and hazards. Hazards may also be displayed in a "vertical" display, showing the position of the aircraft and hazards in a vertical plane.

Figure 1:
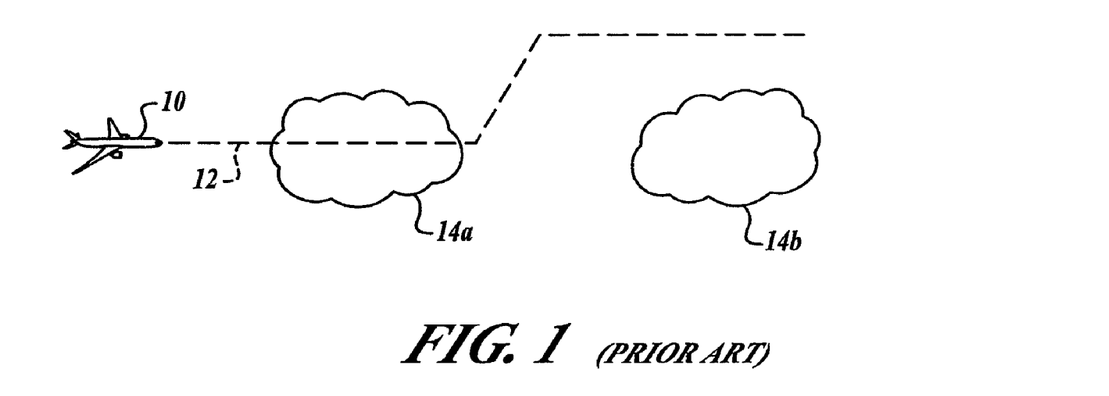
FIG. 1 is a side schematic view of an aircraft, flight path, and intervening hazards.
Figure 2:
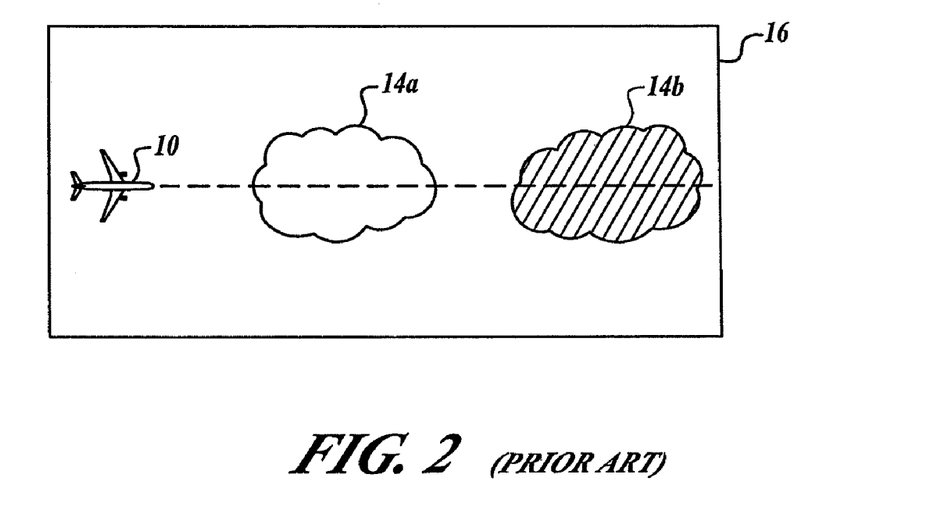
FIG. 2 is an exemplary on-screen representation of coded hazard information.

In the navigational display, it may not be immediately apparent that an aircraft's altitude carries it above or below a hazard such that the hazard does not require attention. Likewise, in the vertical display hazards are not apparent that are slightly to one side or the other horizontally from the aircraft's flight path. In some systems, the surveillance system visually distinguishes symbology representing hazards according to whether the hazards lie along a predicted flight path, or within a specific tolerance of a predicted flight path. Distinctive representation of hazards enables a pilot to focus attention on hazards likely to be encountered by the aircraft. For example, in FIG. 1, the aircraft 10 flying along the predicted flight path 12 is likely to encounter hazard 14a whereas hazard 14b does not lie on the predicted flight path. Accordingly, a navigational display 16 might appear as in FIG. 2 having hazard 14a represented in a solid color whereas hazard 14b is shown with hash marks. Distinctive representation may be accomplished by other markings, fill patterns, colors, and the like. In some systems, a surveillance system is programmed to issue audible, pictoral, and/or textual alerts when a hazard is found to lie along a predicted flight path. Audible alerts may distinguish alerts for on-path hazards from off-path hazards by means of the volume of the alert, the gender of the speaker, words used in the alert, and the like. Accordingly, the surveillance system distinguishes between on- and off-path hazards when determining whether to issue an alert.

The AP, FMS, surveillance system, and various control panels are typically embodied as discrete autonomous units, interfacing with one another in precisely defined ways. The criticality of each of the components means that each must be carefully tested and certified by regulatory agencies before being approved for installation. Modification of the components requires similar testing and regulatory approval. Modification of the AP and associated control panels in particular is an extremely complicated and expensive process because its role in control of the aircraft is so vital.

In one system, the surveillance system receives the planned flight path determined by the FMS. The surveillance system may also be notified of any constraint that has been imposed, such as an altitude ceiling or floor, though in some systems no notice is given and imposition of the constraint is detected by other means. The surveillance system does not receive notice when the constraint ceases to be active. Accordingly, the surveillance system is unable to determine when the aircraft is no longer subject to the constraint and is therefore unable to determine whether the predicted flight path will follow the constrained flight path or the unconstrained planned flight path.

Figure 3A:
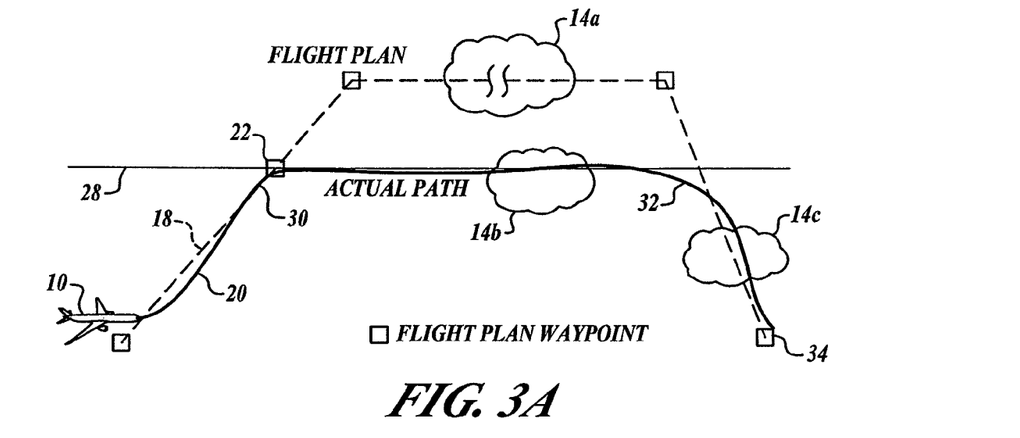
FIGS. 3A and 3B are side schematic views of an aircraft following a flight path subject to a constraint.
Figure 3B:
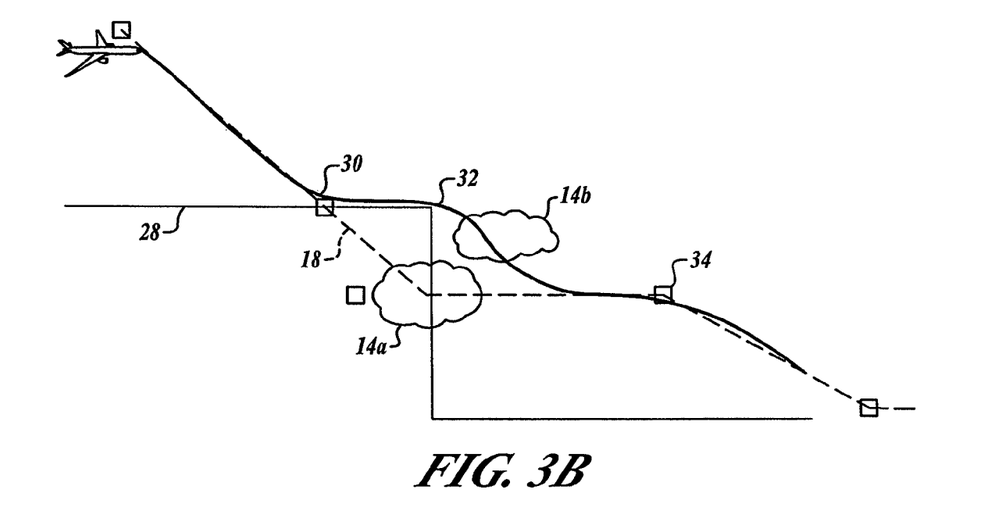

This problem arises in the scenario of FIGS. 3A and 3B illustrating a planned flight path 18 in the vertical view. An aircraft 10 may follow an actual path 20 passing through, or "sequencing," a waypoint 22 forming part of the planned path 18 within an area in which a constraint 28, such as an altitude ceiling (FIG. 3A) or an altitude floor (FIG. 3B) is in effect. At point 30, the actual path 20 of the aircraft 10 transitions from following the planned flight path 18 to conform to the constraint 28. At point 32 the aircraft 10, the aircraft 10 begins to follow the planned path 18 and directs itself toward waypoint 34. In FIG. 3A, the aircraft 10 transitions to the planned path 18 because it lies below the constraint 28. In FIG. 3B, the aircraft 10 transitions because the constraint 28 is changed to an altitude lying below the planned path 18. At points 30 and 32 the surveillance system is not notified which path will be followed as the aircraft 10 moves forward. Accordingly, it is not apparent for which of the hazards 14a-14c to provide alerts.

Accordingly, it would be an advancement in the art to provide systems and methods for resolving which of the constrained flight path and unconstrained flight path will be followed by the aircraft. It would be a further advancement in the art to provide such systems that do not require modification of the AP or the FMS.

SUMMARY OF THE INVENTION

The present invention selects whether the constrained flight path or unconstrained flight path will be followed by an aircraft by evaluating whether the current location of the aircraft is within a predetermined tolerance of a constrained path, taking into account prior determinations, and predicting an unconstrained path will be followed if the current position is not within the tolerance.

Systems and methods for predicted path selection include a controller, such as an autopilot (AP), directly or indirectly actuating control surfaces and propulsion systems of an aircraft to cause the aircraft to follow an actual path. The controller receives a planned path from a flight planner, such as an FMS. The controller also occasionally receives a constraint from a control panel, such as a Flight Control Unit (FCU) or Mode Control Panel (MCP), constraining the actual path followed by the aircraft in at least one direction, such as the vertical direction. The control panel provides an output indicating what the current constraints are, and the controller or FMS may provide output indicating that a constraint has been imposed. One or more of these outputs are provided to a surveillance system operable to detect hazards and may provide a display visually distinguishing on- and off-path hazards.

In some embodiments, the controller, the FMS, or both, do not provide an output to the surveillance system indicating that a constraint has been imposed. In such embodiments the constraint may be detected by analyzing the altitude history of the aircraft 10 to determine if the aircraft is descending onto a floor or ascending from a floor. For example, if an aircraft 10 that was descending levels off at an altitude, the surveillance system may assume that a floor has been encountered. Likewise, if an aircraft that was ascending levels off at an altitude, the surveillance system may assume that a ceiling has been encountered.

The surveillance system compares the current location of the aircraft to the constraint. If the separation between current location and the constraint is outside a predetermined tolerance, the surveillance system displays symbols lying on the planned path as critical. If the separation between the current location and the constraint is within the predetermined tolerance and the surveillance system otherwise determines that a constraint was activated, and then the surveillance system displays symbols lying on the constrained path as critical. Distinguishing of symbols may be accomplished by representing critical and non-critical hazards with differing colors or line styles or fill patterns. Distinguishing hazards as critical or non-critical may also be used in alerting algorithms.

As the aircraft continues forward, selections of the predicted path are validated. In one embodiment, if the aircraft has deviated from the constraint in the direction opposite the flight plan, perhaps due to wind or fuel burn, the FMS will typically guide the aircraft back toward the original flight plan and back into the constraint. Accordingly, the surveillance system may continue to select the constrained path for strategic purposes (e.g. because the aircraft is not within tolerance of the flight plan), or may choose to switch to a tactical display, based on immediate actual flight path (speed and direction) for the period in which the aircraft deviates from the constraint. As the FMS returns the aircraft to within a certain tolerance of the constraint altitude and the aircraft deviates from the planned path to again follow the constrained path, the surveillance system will again select the constrained path as the future path as well as portions of the planned path that do not violate the constraint. Adequate timeguarding may be used to ensures a smooth and consistent presentation to the crew.

In instances where the aircraft has deviated from the constraint in the direction of the flight plan, perhaps again due to winds or fuel burn, either the AP will force the aircraft back to the constraint altitude, such that the constrained path continues to be used for distinguishing hazards, or else not, in which case the surveillance system will switch to either the unconstrained path or a tactical display, depending on proximity to the FMS flight plan and on timeguarding.

As will be readily appreciated from the foregoing summary, the invention provides a reliable method for selecting which of a planned path and a constrained path will be followed by an aircraft for hazard coding purposes. The above described system does not require modification of the AP or FMS.

BRIEF DESCRIPTION OF THE DRAWINGS

The preferred and alternative embodiments of the present invention are described in detail below with reference to the following drawings.

DETAILED DESCRIPTION OF THE INVENTION

Figure 4:
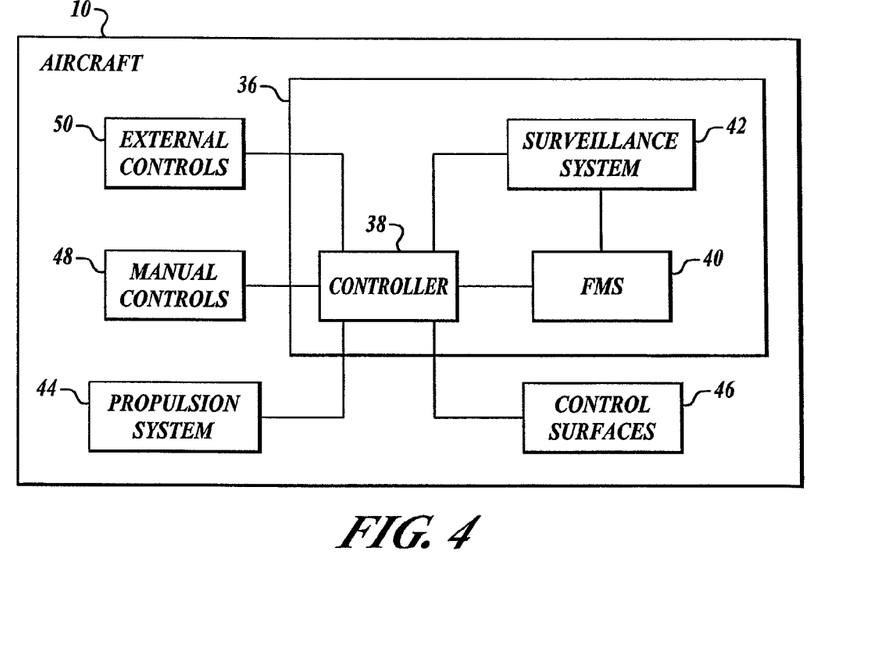
FIG. 4 is a schematic block diagram of components of an avionic control and navigational system formed in accordance with an embodiment of the present invention.

Referring to FIG. 4, in one embodiment an aircraft 10 includes an avionic control system 36, which may include a controller 38, such as an Autopilot (AP) 38, an, FMS 40, and a surveillance system 42. The controller 38 is coupled to the propulsion system 44 and control surfaces 46 of the aircraft 10. The controller 38 is programmed to control the aircraft propulsion systems 44 and control surfaces 46 to achieve a desired trajectory. Manual controls 48 and external controls 50 provide inputs to the controller 38 to provide a trajectory. External controls 50 include directives from systems external to the aircraft 10 such as air traffic control (ATC) or other remote "fly by wire" type systems as may be applicable to manned or unmanned aircraft. The FMS 40 calculates a planned flight path between the current location of the aircraft 10 and a destination and provides a trajectory to the controller 38 to cause the controller 38 to fly the aircraft 10 along the planned flight path. The surveillance system 42 detects hazardous conditions through means such as radar, uploaded weather data, topographical data, air traffic data, and the like. The FMS 40 provides data relating to a planned path to the surveillance system 42 to enable the surveillance system to provide alerts indicating hazards that are located along the planned path or to mark on-path hazards as critical in a strategic display provided to the pilot.

The controller 38 or one of the control panels 48 may provide an input to the FMS 40 and/or surveillance system 42 indicating what the current constraints are. Alternatively, the input is provided to the FMS 40 and the FMS 40 provides an indication that the constraint has become active to the surveillance system 42. In one embodiment, this is accomplished by metadata associated with a waypoint defining a planned flight path provided to the surveillance system 42. The metadata may include a single bit that is set or reset to indicate that a waypoint is a constraint waypoint.

In some embodiments, the surveillance system 42 is not provided notice that a constraint has become active. In such embodiments, the surveillance system 42 may analyze the actual path followed by the aircraft to determine whether a constraint has become active and where the constraint is. For example, the aircraft 10 may ascend according to the planned path 18 and then level off at an altitude not indicated in the planned path 18 as a level off point. The surveillance system 42 may therefore conclude that a constraint has been imposed at the constraint altitude. An altitude floor may be detected in a like manner during descent of the aircraft 10. The surveillance system 42 may also detect imposition of the constraint by analyzing one or more of the actual path of the aircraft 10, the path 18 calculated by the FMS 40, and analysis of flight control laws followed by the FMS, controller 38, and/or other systems within the aircraft 10.

Figure 5:
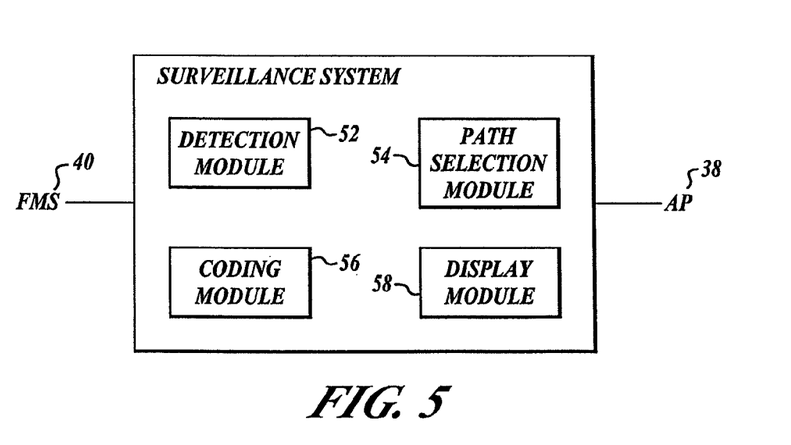
FIG. 5 is a schematic block diagram of a surveillance system suitable for performing predictive flight path selection for hazard coding formed in accordance with an embodiment of the present invention.

Referring to FIG. 5, the surveillance system 42 includes one or more detection modules 52, a path selection module 54, a coding module 56, and a display module 58. A detection module 52 may process radar, uploaded weather, terrain data, air traffic data, and the like in order to evaluate the location of potential hazards. A path selection module 54 determines which of the constrained path and planned path will be used for hazard coding purposes. In one embodiment, the path selection module 54 evaluates the separation between the current position of the aircraft 10 and the constrained path. If the separation exceeds a certain tolerance, the path selection module 54 selects the planned flight as the future path purpose of distinguishing between on- and off-path hazards. If a constraint has been initiated and the separation is less than the tolerance, then the path selection module 54 selects the constrained path and portions of the planned path 18 that do not violate the constraint 28 as the future path for purposes of distinguishing between on- and off-path hazards. A coding module 56 determines which of the detected hazards lies along the path selected by the path selection module 54 in order to code symbols as on- or off-path in a symbolic display provided to the pilot. The display module 58 displays coded symbols representing the hazards on a screen or heads-up display. Alternatively, the display module 58 provides visible or audible alerts when a hazard is detected along the selected path.

Figure 6:
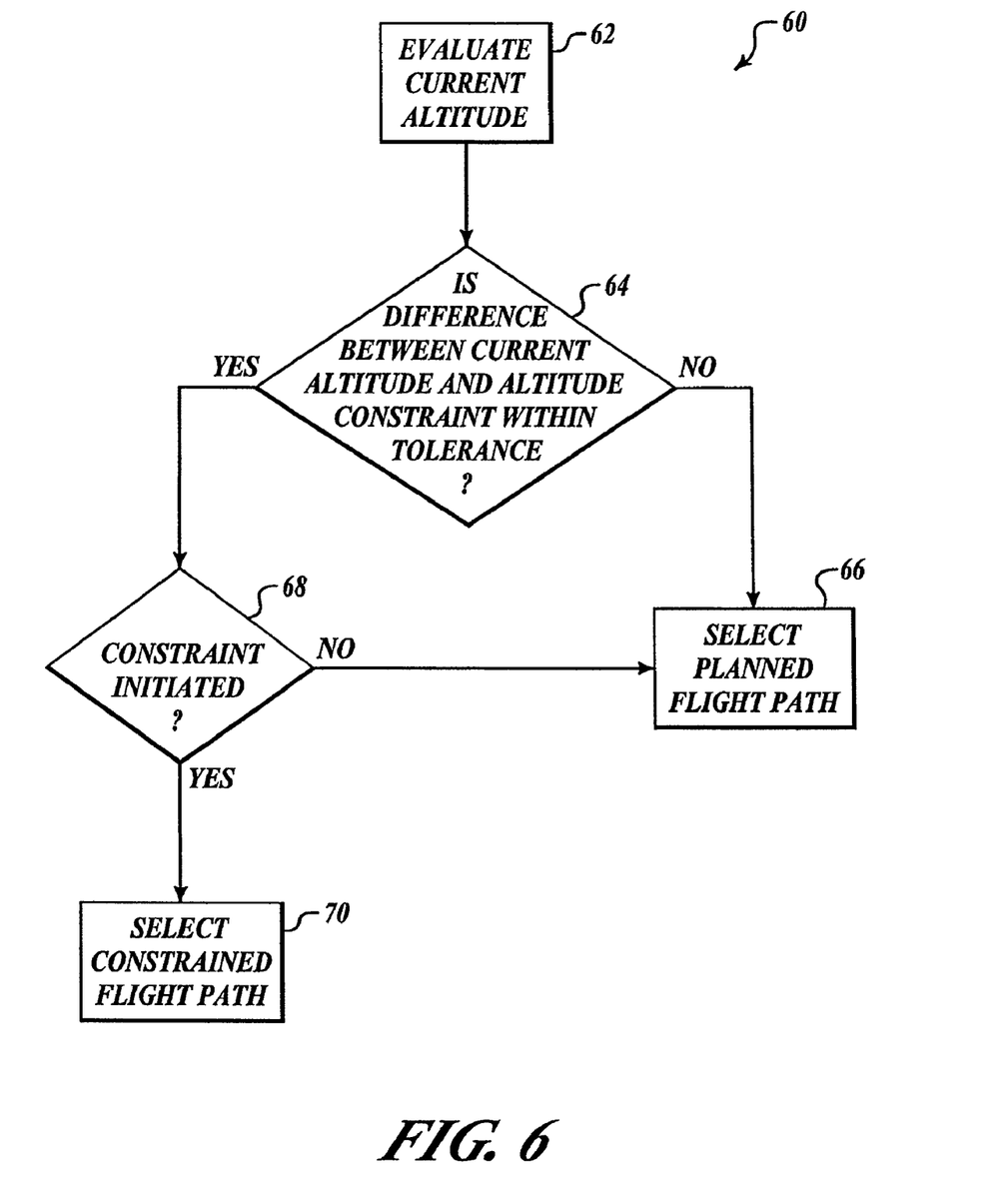
FIG. 6 is a process flow diagram of a method for predictive flight path selection formed in accordance with an embodiment of the present invention.

Referring to FIG. 6, in one embodiment, the path selection module 54 executes a method 60 for determining which of the constrained path and planned path to use for hazard coding purposes. The method 60 includes determining 62 the current location of the aircraft 10. Determining 62 the current location includes evaluating the altitude of the aircraft in instances where the constraint is an altitude constraint. The difference between the current location and the constraint is then evaluated 64 to determine whether the current location is within a predetermined tolerance of the constraint. Differences between the current location and the constraint may be caused by changes in aircraft position or changes in the value of the constraint. The tolerance may be a navigational tolerance substantially equal to the distance an aircraft 10 can deviate from an intended flight path and still be deemed to be following the flight path. Alternatively, the tolerance may be half or some other proportion, of the required vertical separation between aircraft under FAA regulations such as the Reduced Vertical Separation Minimum (RVSM) standards. Vertical separations under the RVSM currently range from 500 feet to 1000 feet depending on the altitude.

If not within tolerance, the path selection module 54 selects 66 the planned path as the future path that will be followed by the aircraft 10 for purposes of distinguishing on- and off-path hazards. If the aircraft's current location is within the tolerance, the method 60 includes evaluating 68 whether a constraint was initiated. Step 68 may therefore include evaluating whether a waypoint, such as the most recently sequenced waypoint, or "from point," is a constraint waypoint. Alternatively, step 68 may include detecting initiation of constraint by other means, such as by detecting leveling off of the airplane at an altitude not on the flight path. If a constraint has not been initiated, the path selection module 54 selects 66 the planned path as the path to be followed by the aircraft 10. If the waypoint is a constraint waypoint, the surveillance system 42 selects 70 the constrained path as the future path for purposes of providing alerts or distinguishing between on- and off-path hazards.

Figure 7:
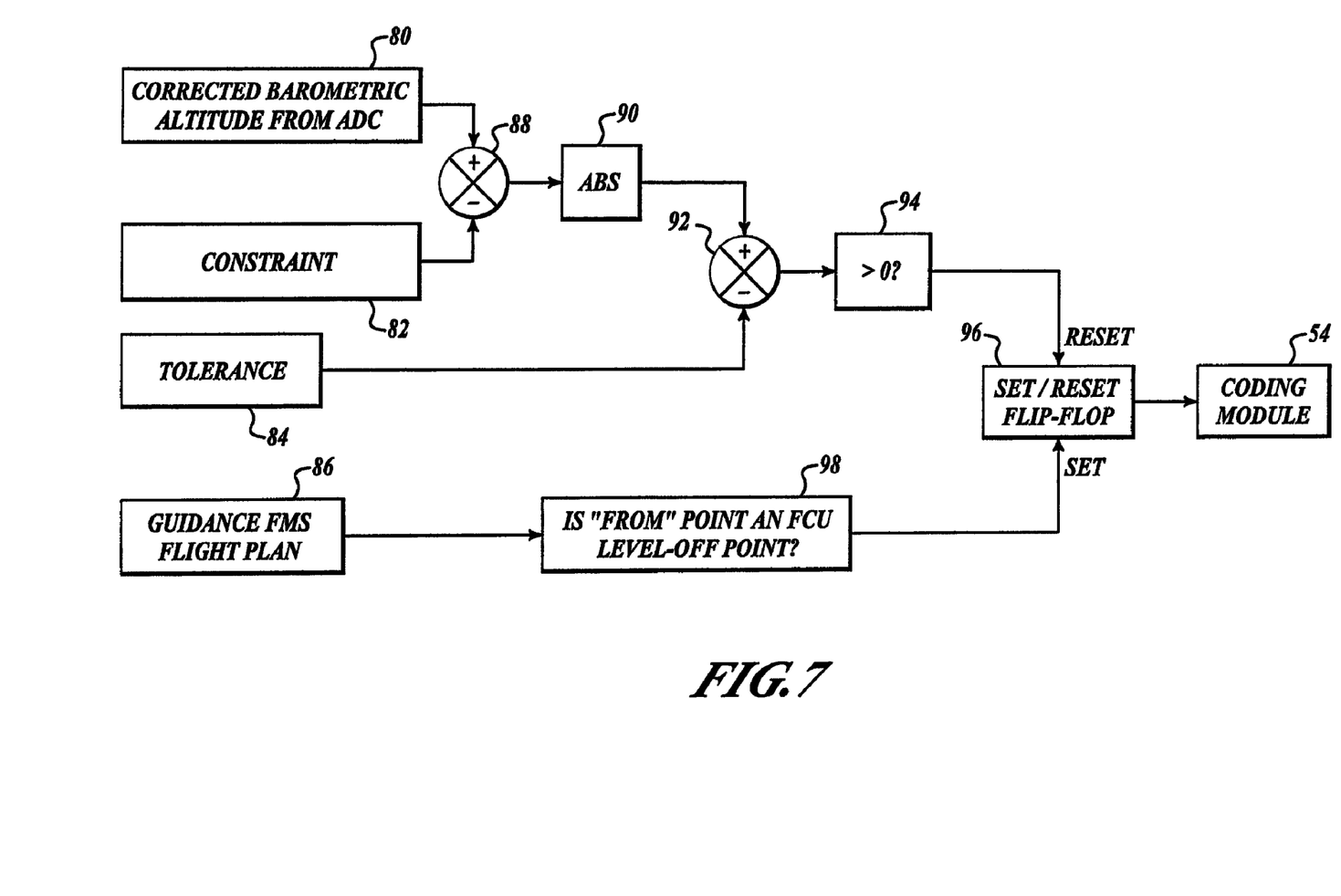
FIG. 7 is a logic diagram for performing predictive flight path selection formed in accordance with an embodiment of the present invention.

FIG. 7 illustrates a logic diagram implementing a method for selecting which of a constrained path and planned path will be followed by an aircraft 10. Inputs to the logical circuit include the current altitude 80 of the aircraft 10, such as a corrected barometric altitude from an air data computer (ADC); the constraint altitude 82; a tolerance 84; and the value 86, or state, of a variable within the flight path generated by the FMS indicating whether the previously sequenced waypoint, or "from" point was a constraint waypoint.

The constraint 82 is subtracted 88 from the current altitude 80 to determine the difference therebetween. The absolute value of the difference is then calculated 90. The tolerance 84 is subtracted 92 from the absolute value and the result is compared 94 to zero. If the absolute value is greater than zero, a status indicator 96 is set to indicate that the planned path is to be used for hazard coding. The status indicator 96 may be a set/reset flip flop having the comparison step 94 resetting the flip flop when the absolute value is greater than zero.

The value 86 indicating the status of the "from" waypoint is evaluated 98 to determine whether the value 86 indicates that the "from" waypoint is a constraint waypoint. If so, the status indicator 96 is updated to indicate that the constrained path is to be used for hazard coding purposes. Where the status indicator 96 is embodied as a set-reset flip flop, the result of the evaluation 98 is input to the set terminal of the flip flop. The status indicator 96 is coupled to the coding module 54 to indicate which of the constrained path and planned path to use for hazard coding. For status indicators 96 embodied as a set/reset flip-flop, an output of a logical one (1) indicates that the constrained path will be used whereas an output of a logical zero (0) indicates that the planned path will be used.

Figure 8A:
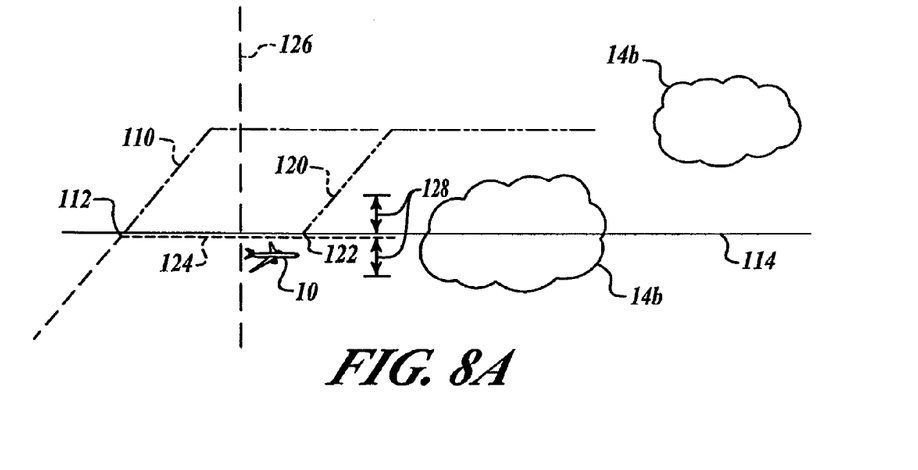
FIGS. 8A and 8B are side schematic views of an aircraft and constrained and unconstrained flight paths formed in accordance with an embodiment of the present invention.
Figure 8B:
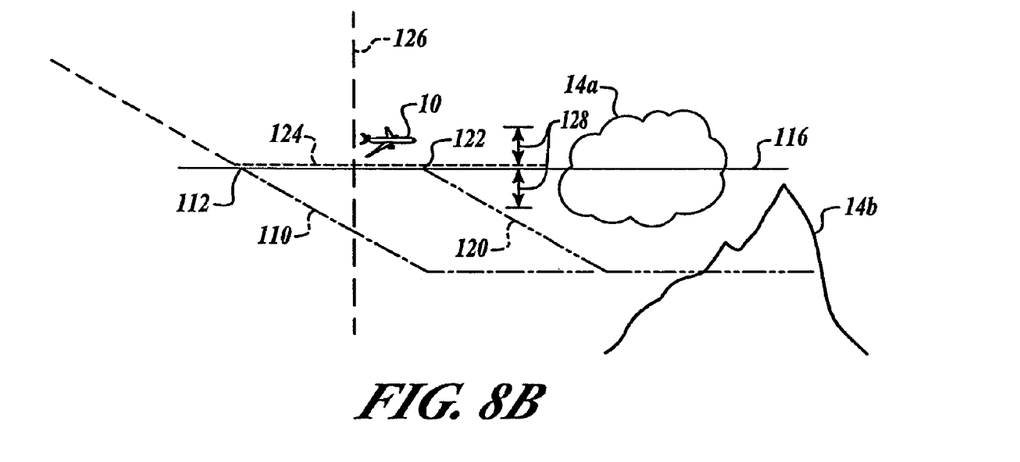

Referring to FIGS. 8A and 8B, in one scenario an aircraft 10 has a planned flight path 110 at point 112. However, an altitude ceiling 114 (FIG. 5A) or altitude floor 116 (FIG. 5B) constrains the aircraft 10 to follow a constrained path 124. The FMS 40 may generate an updated planned path 120 based on the current location of the aircraft 10 at points 122 along the constrained path 124. As the aircraft 10 passes through the boundary 126 of an area subject to a ceiling 114 or floor 116, the surveillance system 42 in some systems is not notified that the ceiling 114 or floor 116 is no longer active.

To resolve this situation, where the current location of the aircraft 10 is separated from the constrained path 124 by a distance greater than a tolerance 128, the path selection module 54 selects the updated planned path 120 as the future path for purposes of distinguishing between on- and off-path hazards. If a constraint has been initiated and the current location of the aircraft 10 is within the tolerance 128, then the path selection module 54 selects the constrained path 124 and portions of the updated planned path 120 that do not violate the constraint 28 as the future path.

The above described novel method for selecting which of the constrained path 124 and updated planned path 120 will be followed by the aircraft 10 is effective to provide accurate hazard coding and hazard alerts. The FMS 40 is typically programmed to update the flight plan during ascent and descent such that the updated planned path 120 originates from the aircraft's current position, which is on or near the constrained path 124 when a constraint is active. Accordingly, differences in short-range hazard coding and alerts will not differ substantially between the constrained path 124 and updated planned path 120. Long and medium range predictions may differ. However, where an aircraft deviates from a constrained path 124 while a constraint should be active, external or pilot input commands will reinstate the constraint, which may result in explicit notice to the surveillance system 42 that the constraint has become active as described above. The surveillance system 42 may also detect reinstating of the constraint by other means such as by detecting leveling off of the airplane at an altitude not on the planned path 120. Until the constraint is reinstated, the assumption that the updated planned path 120 will remain accurate for short range hazard coding and other predictions inasmuch as the updated planned path 120 is constantly updated to reflect the current position of the aircraft. Where the constraint is no longer active, the assumption that the updated planned path 120 will be followed will also be accurate.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for selecting a predicted path, the method comprising:
   detecting activation of a constraint at a surveillance system;
   imposing the constraint on an aircraft flight controller;
   detecting the imposition of the constraint by means of a surveillance means;
   detecting hazard locations;
   calculating a planned flight path;
   detecting an aircraft current location;
   comparing the aircraft current location to the constraint to determine a variation of aircraft current location from the constraint;
   providing alerts of hazards located along the planned path if an absolute value of a difference between an aircraft current altitude and the constraint is greater than the tolerance; and
   refraining from providing alerts of hazards located along the planned path if the absolute value is less than the tolerance.

2. The method of claim 1, further comprising refraining from transmitting an indication of deactivation of the constraint to the surveillance means.

3. The method of claim 2, wherein providing alerts comprises visually displaying relevant symbols representing hazards.

4. The method of claim 3, wherein refraining from providing alerts comprises visually displaying non-relevant symbols representing hazards.

5. The method of claim 4, wherein relevant symbols and non-relevant symbols are distinguished by at least one visual attribute.

6. The method of claim 3 wherein visually displaying relevant symbols further comprises displaying relevant symbols in a navigational display.

7. The method of claim 1, wherein the constraint is an altitude constraint.

8. The method of claim 1, wherein calculating a planned flight path comprises repeatedly updating the planned flight path according to the aircraft current location.

9. A system for selecting a predicted path, the system comprising:
   a flight controller controlling actuators coupled to control surfaces and the propulsion systems of an aircraft and configured to cause the aircraft to follow an actual path, the flight controller receiving a first input describing a planned path and a second input indicating a constraint on the actual path in at least one direction, the flight controller configured to selectively cause the aircraft to conform the actual path to the planned path or a constrained path corresponding to the constraint;
   a flight planner configured to calculate a planned path and input the planned path to the flight controller;
   a surveillance system configured to detect locations of hazards and produce a symbolic display comprising relevant symbols corresponding to hazards near a predicted flight path and non-relevant symbols corresponding to hazards away from the predicted flight path, the surveillance system being further configured to detect activation of the constraint and to compare a current aircraft location to the constrained path upon detecting activation of the constraint, and displaying hazards located along the planned path as relevant when the aircraft location is beyond a tolerance distance from the constrained path.

10. The system of claim 9, wherein the surveillance system displays hazards near the constrained path as relevant when the aircraft location is within the tolerance distance from the constrained path.

11. The system of claim 9, wherein the surveillance system displays hazards near a tactical path as relevant when the aircraft is not within the tolerance distance of the constrained path or the planned path, the tactical path corresponding to a current trajectory of the aircraft.

12. The system of claim 9, wherein the planning means calculates an updated path directing the aircraft from the aircraft location to the planned path.

13. The system of claim 9, wherein the flight planner is configured to calculate a planned path comprising a plurality of interconnected waypoints and to designate one of the plurality of waypoints corresponding to the aircraft current position as a from point, the flight planner receiving the activation output and inputting the from point to the surveillance system as a constraint waypoint if the flight controller is conforming to the constrained path.

* * * * *